US 9,189,425 B2

(12) United States Patent
Farrugia et al.

(10) Patent No.: US 9,189,425 B2
(45) Date of Patent: Nov. 17, 2015

(54) PROTECTING LOOK UP TABLES BY MIXING CODE AND OPERATIONS

(75) Inventors: Augustin J. Farrugia, Cupertino, CA (US); Benoit Chevallier-Mames, Paris (FR); Bruno Kindarji, Paris (FR); Mathieu Ciet, Paris (FR); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 1024 days.

(21) Appl. No.: 13/286,117

(22) Filed: Oct. 31, 2011

(65) Prior Publication Data

US 2013/0061061 A1    Mar. 7, 2013

Related U.S. Application Data

(60) Provisional application No. 61/530,355, filed on Sep. 1, 2011.

(51) Int. Cl.
G06F 12/14 (2006.01)
G09C 1/00 (2006.01)
H04L 9/06 (2006.01)

(52) U.S. Cl.
CPC .............. *G06F 12/1408* (2013.01); *G09C 1/00* (2013.01); *H04L 9/0631* (2013.01); *H04L 2209/16* (2013.01); *H04L 2209/24* (2013.01)

(58) Field of Classification Search
CPC . H04L 9/0618; H04L 9/0631; H04L 2209/24; H04L 2209/16; G06F 12/1408
USPC ................. 713/190; 726/26; 380/42
See application file for complete search history.

(56) References Cited

U.S. PATENT DOCUMENTS

| 2009/0158051 | A1* | 6/2009 | Michiels et al. ............. 713/189 |
| 2009/0254759 | A1* | 10/2009 | Michiels et al. ............. 713/189 |
| 2010/0080395 | A1* | 4/2010 | Michiels et al. ............. 380/278 |
| 2010/0299515 | A1* | 11/2010 | Michiels et al. ............. 713/150 |
| 2011/0055591 | A1* | 3/2011 | Rivain et al. .................. 713/189 |
| 2012/0002807 | A1* | 1/2012 | Michiels et al. ............... 380/28 |
| 2012/0093313 | A1* | 4/2012 | Michiels ....................... 380/255 |
| 2012/0170739 | A1* | 7/2012 | Karroumi et al. ............. 380/28 |
| 2012/0179919 | A1* | 7/2012 | Farrugia et al. ............. 713/193 |

OTHER PUBLICATIONS

Zhuang et al, Hardware Assisted Control Flow Obfuscation for Embedded Processors, Sep. 25, 2004, ACM, pp. 292-302.*
Ge et al, Control Flow Based Obfuscation, Nov. 7, 2005, ACM, pp. 83-92.*

* cited by examiner

*Primary Examiner* — Bradley Holder
*Assistant Examiner* — Jenise Jackson
(74) *Attorney, Agent, or Firm* — Blakely, Sokoloff, Taylor & Zafman LLP

(57) ABSTRACT

In the field of computer enabled cryptography, such as a cipher using lookup tables, the cipher is hardened against an attack by a protection process which obscures the lookup tables using the properties of bijective functions and applying masks to the tables' input and output values, for encryption or decryption. This is especially advantageous in a "White Box" environment where an attacker has full access to the cipher algorithm, including the algorithm's internal state during its execution. This method and the associated computing apparatus are useful for protection against known attacks on "White Box" ciphers, by obfuscating lookup table data, thereby increasing the cipher's complexity against reverse engineering and other attacks.

26 Claims, 4 Drawing Sheets

PROTECTING LOOK UP TABLES BY MIXING CODE AND OPERATIONS

CROSS REFERENCE TO RELATED APPLICATION

This application claims priority to U.S. Provisional Application No. 61/530,355, filed Sep. 1, 2011, incorporated by reference in its entirety.

FIELD OF THE INVENTION

This invention relates to data security, cryptography and obfuscation.

BACKGROUND

In the field of data security, there is a need for fast and secure encryption. This is why the AES (Advanced Encryption Standard) cipher has been designed and standardized to replace the DES (Data Encryption Standard) cipher. Cryptographic algorithms are widely used for encryption and decryption of messages, authentication, digital signatures and identification. AES is a well known symmetric block cipher. Block ciphers operate on blocks of plaintext and ciphertext, usually of 64 or 128 bits length but sometimes longer. Stream ciphers are the other main type of cipher and operate on streams of plain text and cipher text 1 bit or byte (sometimes one word) at a time. There are modes of operation (notably the ECB, electronic code block) where a given block is encrypted to always the same ciphertext block. This is an issue which is solved by a more evolved mode of operations, e.g. CBC (cipher block chaining) where a chaining value is used to solve the 1-to-1 map.

AES is approved as an encryption standard by the U.S. Government. Unlike its predecessor DES (Data Encryption Standard), it is a substitution permutation network (SPN). AES is fast to execute in both computer software and hardware implementation, relatively easy to implement, and requires little memory. AES has a fixed block size of 128 bits and a key size of 128, 192 or 256 bits. Due to the fixed block size of 128 bits, AES operates on a 4×4 array of bytes. It uses key expansion and like most block ciphers a set of encryption and decryption rounds (iterations). Block ciphers of this type include in each round use of substitution boxes (S-boxes). This operation provides non-linearity in the cipher and significantly enhances security.

Note that these block ciphers are symmetric ciphers, meaning the same key is used for encryption and decryption. As is typical in most modern ciphers, security rests with the (secret) key rather than the algorithm. The S-boxes accept an n-bit input and provide an m-bit output. The values of m and n vary with the cipher and the S-box itself. The input bits specify an entry in the S-box in a particular manner well known in the field.

Many encryption algorithms are primarily concerned with producing encrypted data that is resistant to decrypting by an attacker who can interact with the encryption algorithm only as a "Black Box" (input-output) model, and cannot observe internal workings of the algorithm or memory contents, etc. due to lack of system access. The Black Box model is appropriate for applications where trusted parties control the computing systems for both encoding and decoding ciphered materials.

However, many applications of encryption do not allow for the assumption that an attacker cannot access internal workings of the algorithm. For example, encrypted digital media often needs to be decrypted on computing systems that are completely controlled by an adversary (attacker). There are many degrees to which the Black Box model can be relaxed. An extreme relaxation is called the "White Box" model. In a White Box model, it is presumed that an attacker has total access to the system performing an encryption (or decryption), including being able to observe directly a state of memory, program execution, modifying an execution, etc. In such a model, an encryption key can be observed in or extracted from memory, and so ways to conceal operations indicative of a secret key are important.

Classically, software implementations of cryptographic building blocks are insecure in the White Box threat model where the attacker controls the execution process. The attacker can easily lift the secret key from memory by just observing the operations acting on the secret key. For example, the attacker can learn the secret key of an AES software implementation by observing the execution of the key schedule algorithm.

Hence there are two basic principles in the implementation of secure computer applications (software). The Black Box model implicitly supposes that the user does not have access to the computer code nor any cryptographic keys themselves. The computer code security is based on the tampering resistance over which the application is running, as this is typically the case with SmartCards. For the White Box model, it is assumed the (hostile) user has partially or fully access to the implemented code algorithms; including the cryptographic keys themselves. It is assumed the user can also become an attacker and can try to modify or duplicate the code since he has full access to it in a binary (object code) form. The White Box implementations are widely used (in particular) in content protection applications to protect e.g. audio and video content.

Straightforward software implementations of cryptographic building blocks are insecure in the White Box threat model where the attacker controls the computer execution process. The attacker can easily extract the (secret) key from the memory by just observing the operations acting on the secret key. For instance, the attacker can learn the secret key of an AES cipher software implementation by passively monitoring the execution of the key schedule algorithm. Also, the attacker could be able to retrieve partial cryptographic result and use it in another context (using in a standalone code, or injecting it in another program, as an example).

Content protection applications such as for audio and video data are one instance where it is desired to keep the attacker from finding the secret key even though the attacker has complete control of the execution process. The publication "White-Box Cryptography in an AES implementation" Lecture Notes in Computer Science Vol. 2595, Revised Papers from the 9th Annual International Workshop on Selected Areas in Cryptography pp. 250-270 (2002) by Chow et al. discloses implementations of AES that obscure the operations performed during AES by using table lookups (also referred to as TLUs) to obscure the secret key within the table lookups, and obscure intermediate state information that would otherwise be available in arithmetic implementations of AES. In the computer field, a table lookup table is an operation consisting of looking in a table (also called an array) stored in a computer memory at a given index position in the table.

Chow et al. (for his White Box implementation where the key is known at the computer code compilation time) uses 160 separate tables to implement the 11 AddRoundKey operations and 10 SubByte Operations (10 rounds, with 16 tables per round, where each table is for 1 byte of the 16 byte long—128 bit—AES block). These 160 tables embed a particular AES key, such that output from lookups involving these tables embeds data that would normally result from the AddRoundKey and SubByte operations of the AES algorithm, except that this data includes input/output permutations that make it more difficult to determine what parts of these tables represent round key information derived from the AES key. Chow et al. provide a construction of the AES algorithm for such White Box model. The security of this construction resides in the use of table lookups and permutations supplied on the input and output of table lookups. The input and output mask applied to this data is never removed along the process. In this solution, there is a need for knowing the key value at the compilation time, or at least to be able to derive the tables from the original key in a secure environment or in a secure way.

The conventional implementation of a block cipher in the White Box model is carried out by creating a set of table lookups. Given a dedicated cipher key, the goal is to store in a table the results for all the possible input messages. This principle is applied for each basic operation of the block cipher. In the case of the AES cipher, these are the shiftRow, the add RoundKey, the subByte and the mixColumns operations.

So software implementations of cryptographic building blocks (operations) are insecure in the White Box threat model where as explained above the attacker controls the execution process. The attacker can easily lift the secret key from computer memory by just observing the operations acting on the secret key. For example, the attacker can learn the secret key of an AES software implementation by observing the execution of the key schedule algorithm.

AES and other ciphers need the lookup tables stored in memory as explained above to be executed at a reasonable speed. However, the tables in the White Box implementation may be computed from the AES S-box and use important information such as keys, masks, etc. If an attacker is able to obtain a copy of these tables, he will gain an advantage in understanding the code.

SUMMARY

Making these tables hard to understand is an important point for White Box implementation. This disclosure is directed to new ways to protect the lookup tables, by applying non-trivial transformations to them. These transformations can be corrected with execution of a few instructions and furthermore, they may be seen by an attacker as a dynamic XOR mask.

DETAILED DESCRIPTION

AES Description

Figure 1:
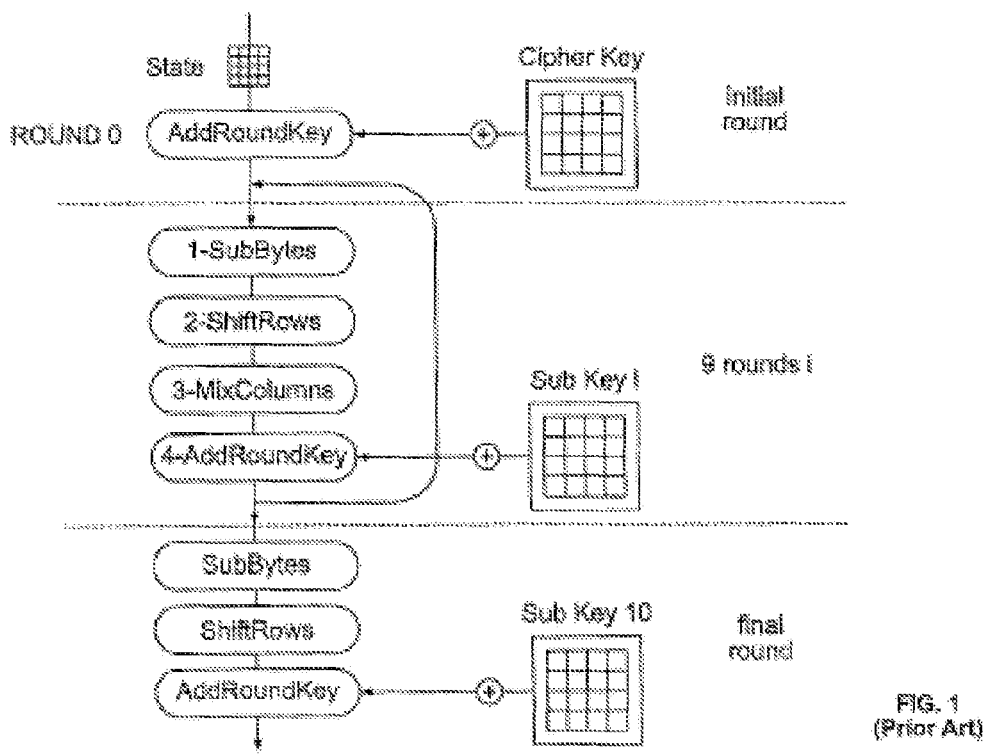
FIG. 1 shows, in the prior art, AES encryption.

See the NIST AES standard for a more detailed description of the AES cipher: Specification for the ADVANCED ENCRYPTION STANDARD (AES), NIST, http://csrc.nist-.gov/publications/fips/fips197/fips-197.pdf. The following is a summary of the well known AES cipher. The AES cipher uses a 16 byte cipher key, and has 10 rounds (final round plus 9 others). The AES encryption algorithm has the following operations as depicted graphically in prior art FIG. 1 and showing round zero of the rounds:

11 AddRoundKey Operations
10 SubByte Operations
10 ShiftRow Operations
9 MixColumn Operations AES is computed using a 16-byte buffer (computer memory) referred to as the AES "state" in this disclosure and shown in FIG. 1.

To summarize,
(i) AddRoundKeys (ARK) logically XOR (the Boolean exclusive OR operation) some sub-key bytes with the state bytes.
(ii) ShiftRows (SR) are a move from one byte location to another.
(iii) MixColums (MC) are a linear table-look up (TLU), applied to 4 bytes.
(iv) SubBytes (SB) are a non-linear TLU, applied to 1 byte.

Preliminarily to the encryption itself, in the initial round in FIG. 1, the original 16-byte cipher key is expanded to 11 sub-keys (also called round keys) designated K0, ..., K10, so there is a sub-key for each round, during what is called the key-schedule. Each sub-key, like the original cipher key, is 16-bytes long.

The following explains AES decryption round by round. For the corresponding encryption (see FIG. 1), one generally performs the inverse of each operation, in the inverse order. (The same is true for the cryptographic processes in accordance with the invention as set forth below.) The inverse operation of ARK is ARK itself, the inverse operation of SB is the inverse subbyte (ISB) which is basically another TLU, the inverse operation of MC is the inverse mix column (IMC) which is basically another TLU, and the inverse operation of SR is the inverse shift row (ISR) which is another move from one byte location to another.

Expressed schematically, AES decryption round-by-round is as follows:

ARK (K10)
ISR
ISB
ARK (K9)
IMC
ISR
ISB
ARK (K8)
IMC
ISR
ISB
ARK (K7)
IMC
ISR
ISB
ARK (K6)
IMC
ISR
ISB
ARK (K5)
IMC
ISR
ISB
ARK (K4)
IMC
ISR
ISB
ARK (K3)

IMC
ISR
ISB
ARK (K2)
IMC
ISR
ISB
ARK (K1)
IMC
ISR
ISB
ARK (K0)

It is evident that the method in accordance with the invention can be used for decryption, encryption (see FIG. 1 showing conventional AES encryption) or other cryptographic processes. The method in accordance with the invention also can easily be applied to other variants of AES with more rounds (the 192 and 256-bit key length versions even with a 128 bit block size) as well as to other block ciphers and more generally to non-block ciphers and other cryptographic processes.

AES is considered very efficient in terms of execution on many different computer architectures since it can be executed only with table lookups (TLU) and the exclusive-or (XOR) operation. It is known that the AES state can be handled as a 4×4 square of bytes. As a square, it can be seen as 4 columns of 4 bytes each.

As described above, AES decryption is a succession of basic operations: ISB for the inverse of SubByte, IMC (for the inverse of MixColumn) and ISR (for the inverse of ShiftRow). The ISR operation modifies the state by shifting each row of the square. This operation does not modify the bytes themselves but only their respective positions. The ISB operation is a permutation from [0, 255] to [0, 255], which can be implemented by a table look-up.

Notation

The symbol $\oplus$ here denotes the Boolean logic "exclusive OR" (XOR operation), which is a binary operator over two values.

If b denotes a bijection, $b^{-1}$ is its inverse bijection, i.e. the unique function such that for all values x, $b^{-1}(b(x))=x$ If T denotes a table, T[x] denotes the x-th value in this table.

"<<" (respectively ">>") is the conventional binary left (respectively right) bit shift operation.

"<<<" (respectively ">>>") is the conventional binary left (respectively right) bit rotation operation, which means that the i least significant bits of (x<<<i) become the i most significant bits of x, and the (w−i) most significant bits of (x<<<i) become the (w−i) least significant bits of x, where w is the size (in bits) of x.

So to explain the present method, let G: x->G(x) denote a bijection function (on bytes) defined as:

$$G(x)=x\oplus F(x) \quad (1)$$

where F is a given function.

Preliminarily, assume there are numerous such functions. It is shown below how to generate such functions efficiently.

Let $G_1$ and $G_2$ denote two such functions, where:

$$G_1(x)=x\oplus F_1(x)$$

$$G_2(x)=x\oplus F_2(x)$$

Let T denote a given table.

T' then denotes the masked version of table T, defined as:

$$T'[y]=G_2^{-1}(T[G_1^{-1}(y)]) \quad (2)$$

This means, apply the inverse of $G_1$ to the input value to the table (i.e., the value y) and then apply the inverse of $G_2$ to the output value of the table, i.e., the T[something] value.

Figure 4:
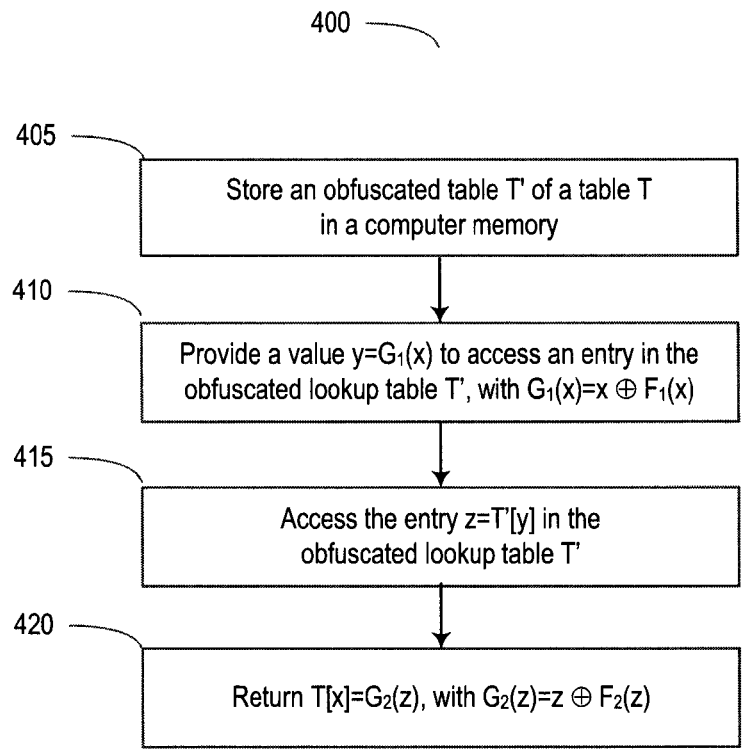
FIG. 4 illustrates a method of recovering an original (non-obfuscated) table entry T[x] from an obfuscated table T'.

FIG. 4 illustrates a method 400 of recovering an original (non-obfuscated) table entry T[x] from an obfuscated table T'. Given the table T', recovering the original (non-obfuscated) table entry T[x] from T' and x is carried out by executing the following steps:
1. Compute $y=x\oplus F_1(x)=G_1(x)$, as shown in operation 410 of FIG. 4;
2. Compute z=T'[y], as shown in operation 415 of FIG. 4;
3. Return $z\oplus F_2(z)=G_2(z)$, which is equal to T[x], as shown in operation 420 of FIG. 4.

In the field of code (software) obfuscation, data are masked with various known methods. One of them is called "Boolean masking" and replaces the use of a data designated d by value $d\oplus r$, where r is a random value (chosen at the source code compilation time or at runtime); original data d thereby does not appear in computer memory and is always replaced by value $d\oplus r$. With the previous result, the values y and T[x] are computed using a final XOR operation. Indeed, $y=x\oplus F_1(x)$ and $T[x]=z\oplus F_2(z)$. Then, during the code (cipher process) execution, values $F_1(x)$ and $F_2(z)$ are applied as Boolean masks on values x and z respectively. Since $F_1(x)$ and $F_2(z)$ depend respectively on x and z, they misleadingly appear to be dynamic masks to an attacker. This enhances security.

When functions $F_1$ and $F_2$ are executed by computer processor instructions (as opposed to being executed by data look up tables stored in memory) such as $+, -, *, <<<, <<, >>, >>>, /$ (division), etc, retrieving the value within the table T, an attacker has to retrieve T' and has to isolate and reverse the part of the code dedicated to computing functions $F_1$ and $F_2$. Thus this enables one to protect tables which are stored in memory, by mixing tables (data) and processor instructions.

As shown above, this is an efficient solution, since the mask value is a function of the value x, contrary to most known masking techniques. It will be complicated for an attacker to recover the functions $F_1$ and $F_2$ from the code, since they are mixed in with the rest of the code (by the present obfuscation process), and so it will be complicated to recover the original table T, with its hidden secrets.

Efficient G Function Generation

Assume that integers are represented in base 2. On a computer, each integer number h (expressed in bit form) has a width, denoted here w, usually having a value of 8, 16, 32, 64, 128. This width is the maximum number of bits that defines an integer. Since integers have width, it is possible to define some special operations on these representations that are not classical integer operations. The operations here are bit shifts and bit rotations. As explained above, right shift (respectively left shift) shifts each bit of an integer to the right (respectively left) by a specified value and removes the top right (respectively left) bits. These operations are denoted here >> and <<. Other such known operations are left and right bit rotations, denoted here <<< and >>>. These rotations are rotations on the bit representation of the integer.

Let F be a function with the following property:
For all x input, for all i in 1 to w, $$(F(x)<<(i-1))>>(i-1)=F((x<<i)>>i) \quad (3)$$

This particularly implies that F(0)=0.

Given a function F with the above property, function G defined as in equation (1) above is a bijection.

To prove this, one can construct an algorithm that inverts function G. As above, w denotes the width of the integer representation.

The bitwise algorithm to generate x from y is:

Input y=G(x)

Output x(=$G^{-1}(y)$)

For bit (w−1) of x:

$$(x << (w-1)) >> (w-1) = (x << (w-1)) >> (w-1) \oplus F(0)$$
$$= (x << (w-1)) >> (w-1) \oplus F((x << w) >> w)$$
$$= (x << (w-1)) >> (w-1) \oplus$$
$$(F(x) << (w-1)) >> (w-1)$$
$$= (y << (w-1)) >> (w-1)$$

For each subsequent bit (w−(i−1)) of x:

$$(x << (w-(i-1))) >> (w-(i-1)) = \ldots$$
$$(x << (w-i)) >> (w-i) = (y << (w-i)) >> (w-i) \oplus F(x << (w-(i-1))) >> (w-(i-1)))$$
$$(x << (w-(i+1))) >> (w-(i+1)) = \ldots$$

So the result is:

$$x = y \oplus F((x<<1)>>1)$$

The main ideas in this algorithm are:
1. $F(0)=0=F((x<<w)>>w)$, since any left or right shift of all w bits necessarily results in value 0.
2. $(x<<(w-1))>>(w-1) \oplus (F(x)<<(w-1))>>(w-1) = ((x \oplus F(x))<<(w-1))>>(w-1)$, because XOR is a bitwise operator.

So this is a proof that also enables one to compute the final x using w steps. This proves that functions F verifying equation (3) above allow one to generate invertible G functions.

Equation (3) above uses right and left bit shifts. Their roles can be inverted, resulting in:

$$(F(x)>>(i-1))<<(i-1) = F((x>>i)<<i) \quad (4)$$

To prove the symmetric role of left and right bit shifts, the same algorithm as above can easily be constructed.

So one can use F such that for all x input, for all i in 1 to w, $$(F(x)<<(i-1))>>(i-1) = F((x<<i)>>i) \quad (3)$$

to construct $$G(x) = x \oplus f(x)$$

One could use F such that for all x inputs, for all i in 1 to w, $$(F(x)>>(i-1))<<(i-1) = F((x>>i)<<i) \quad (3)$$

to construct $$G(x) = x \oplus F(x)$$

In the following, simple functions F and G are presented.

Left-Shifting a Function

Let P be a function made up of the conventional arithmetic and logical operations +, −, $\oplus$ (XOR), *, & (AND), | (OR), <<, plus some constants; then the F function satisfying the following equation:

$$F(x) = 2*P(x) = P(x)<<1$$

verifies equation (3).
Indeed:

$$(F(x)<<(i-1)) >> (i-1) = F(x) \text{ modulus } [2^{w-(i-1)}]$$
$$= (2*P(x)) \text{ modulus } [2^{w-(i-1)}]$$
$$= 2*(P(x) \text{ modulus } [2^{w-i}]) \quad (5)$$
$$= 2*(P(x \text{ modulus } [2^{w-i}])) \quad (6)$$
$$= 2*(P((x<<i)>>i))$$

The most difficult part to compute is equations (5) and (6). This is however a classical result for conventional logical bitwise or arithmetic operations (+, −, $\oplus$, *, &, |, <<) that:

$$P(x) \text{modulus} [2^{(w-i)}] = P(x \text{ modulus} [2^{w-i}]).$$

Right-shifting a Function

For equation (4), one can analogously define F functions as:

$$F(x) = P(x)/2 = P(x) >> 1$$

where P is a function made up of the operations $\oplus$, &, |, >>.

All in all, it is possible to construct F functions with the above equations.

For instance, the previous results show that $$x \oplus (2*x*x), \text{ and}$$

$$x \oplus ((x\&(x>>1))>>1)$$

are examples of such invertible G functions.

The inverse of such a G function can be computed easily following the algorithm described above; moreover, it can be computed at the time of code obfuscation, i.e. when the source code to be run is generated. This produces the table T'.

Rotating a Function

If P is a function as described above, then it is also possible to construct a function F as follows:

$$F(x) = P(x <<< i) >>> i \quad (7)$$

Indeed, if $G(x) = x \oplus F(x)$, one obtains $G'(x) = x \oplus P(x)$ by computing:

$$G'(x) = G(x >>> i) <<< i$$
$$= ((x >>> i) \oplus F(x >>> i)) <<< i$$
$$= x \oplus (F(x >>> i) <<< i)$$
$$= x \oplus P(x)$$

Since function G' is a bijection, function G is the composition of a bijection with two rotation functions, and thus, itself a bijection.

Generalization

The above considered the equation:

$$G(x) = x \oplus F(x) \quad (1)$$

However, for a function F verifying equation (3), one knows that the functions:

$$G(x) = x + F(x) \quad (8)$$

and $$G(x) = x - F(x) \quad (9)$$

are also invertible functions. So one could use G functions with the + or − operations instead of the XOR operation. So generally, one can use G functions with $\oplus$, +, − and other arithmetic or logical bitwise operations that are invertible. The function F is chosen such that functions G defined by (8) and (9) above are invertible. An example of function F is given in equation (3), which is also a proof that functions F exist.

As readily understood by one skilled in the art, implementation of the above method first requires expressing a conventional (non-obfuscated) cryptographic (or similar) process as computer source code including table lookups, such as the conventional AES cipher encryption or decryption processes. Then one alters (transcodes) the conventional source code as described above so as to obfuscate the original TLU's to be instead a combination of obfuscated tables and logical and arithmetic processor instructions. This transcoded source code is then conventionally compiled into object code and executed, to carry out the cryptographic process. The above solutions thereby enable one to easily mix tables and operations in a cryptographic or similar process. Furthermore, the obfuscation would be seen by a hacker (erroneously) as being dynamic masking techniques. The above also shows how to implement these solutions with efficient formulas.

Figure 2:
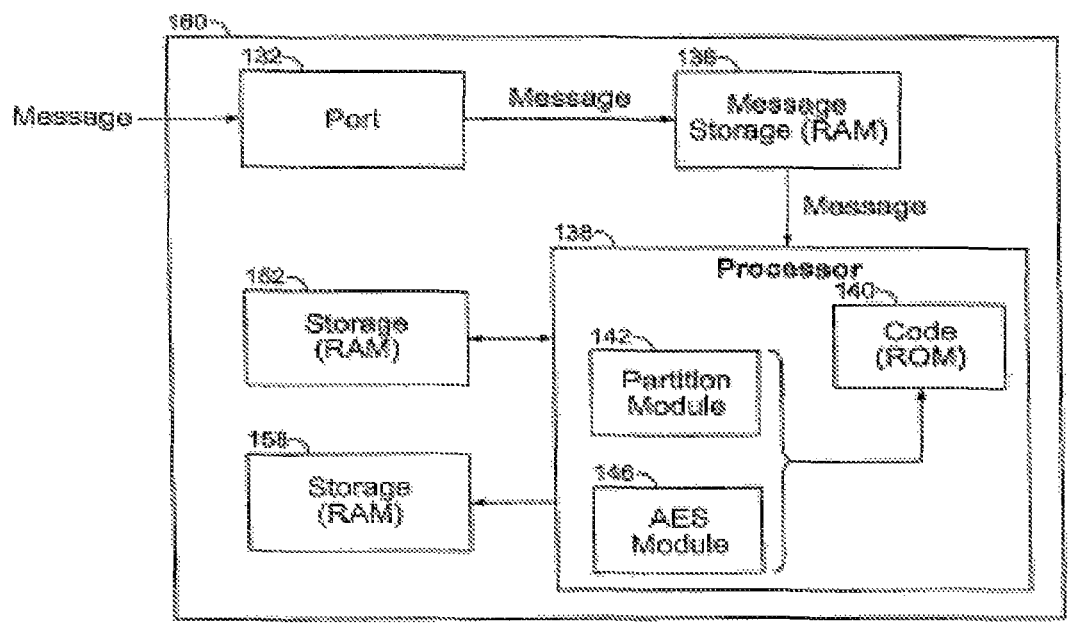
FIG. 2 shows a computing system in accordance with the invention.

FIG. 2 shows in a block diagram relevant portions of a computing device (system) 160 in accordance with the invention which carries out the obfuscated cryptographic processes as described above. A similar computing device would be used to obfuscate the source code, as described above. This is, e.g., a server platform, computer, mobile telephone, Smart Phone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity. Essentially a similar apparatus encrypts the message, and may indeed be part of the same platform.

The computer code is conventionally stored in code memory (computer readable storage medium) 140 (as object code or source code) associated with conventional processor 138 for execution by processor 138. The incoming ciphertext (or plaintext) message (in digital form) is received at port 132 and stored in computer readable storage (memory 136 where it is coupled to processor 138. Processor 138 conventionally then partitions the message into suitable sized blocks at partitioning module 142. Another software (code) module in processor 138 is the decryption (or encryption) module 146 which carries out the decryption or encryption processes as set forth above, with associated computer readable storage (memory) 152.

Also coupled to processor 138 is a computer readable storage (memory) 158 for the resulting decrypted plaintext (or encrypted ciphertext) message. Storage locations 136, 140, 152, 158 may be in one or several conventional physical memory devices (such as semiconductor RAM or its variants or a hard disk drive). Electric signals conventionally are carried between the various elements of FIG. 2. Not shown in FIG. 2 is any subsequent conventional use of the resulting plaintext or ciphertext stored in storage 145.

Figure 3:
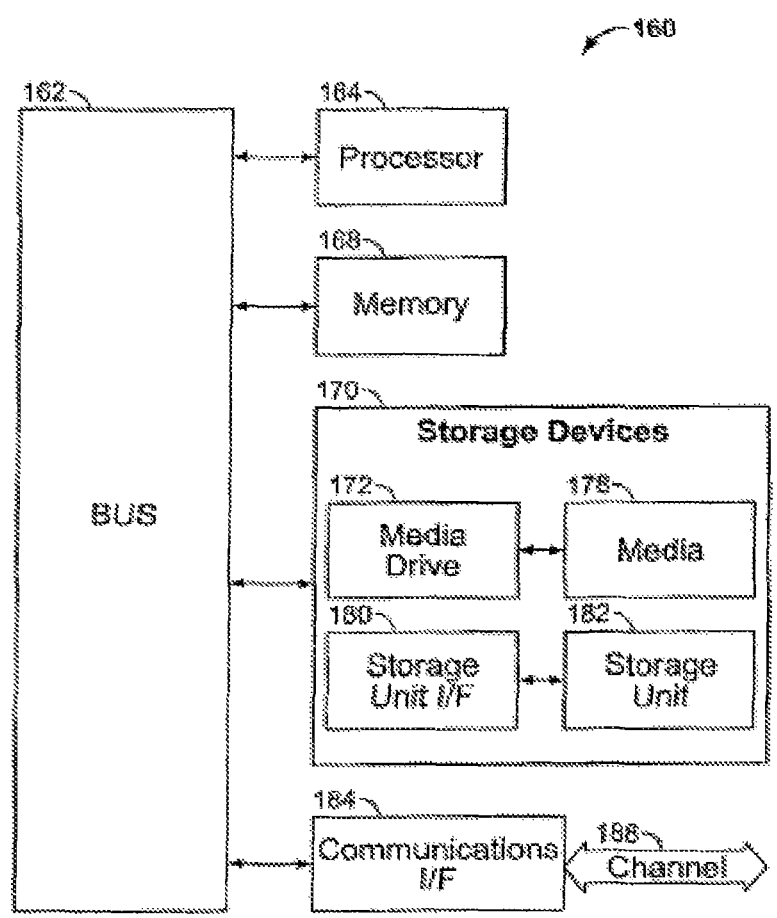
FIG. 3 shows a computing system as known in the art and used in accordance with the invention.

FIG. 3 illustrates detail of a typical and conventional embodiment of computing system 160 that may be employed to implement processing functionality in embodiments of the invention as indicated in FIG. 2 and includes corresponding elements. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 2). Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168 (equivalent of memories 136, 140, 152, and 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to part 132 in FIG. 2). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A computer-implemented method of obtaining an original (non-obfuscated) table entry T[x], the $X^{th}$ value of a lookup table T that encodes one or more operations of a cryptographic process, from an obfuscated lookup table T' stored in a computer readable memory circuit of a computing system that includes a processing system having at least one hardware processor, the method comprising:
    providing, by the processing system having at least one hardware processor, a value $y=G_1(x)$ to access an entry in the obfuscated lookup table T', where $G_1$ is a first function, where $G_1(x)$ is obtained by performing a first operation upon x and a first predetermined invertible function $F_1(x)$;
    accessing, in the computer readable memory circuit, the obfuscated lookup table T' to obtain a value $z=T'[y]$, where T'[y] is the $y^{th}$ value of the obfuscated lookup table T';
    returning to the cryptographic process the original, non-obfuscated table entry $T[x]=G_2(z)$, where $G_2$ is a second function, and $G_2(z)$ is obtained by performing a second operation upon z and a second predetermined invertible function $F_2(z)$.

2. The method of claim 1, wherein each of the predetermined functions $F_1(x)$ and $F_2(z)$ is computed using predetermined invertible Boolean logic and arithmetic operations.

3. The method of claim 2, wherein the arithmetic operations performed in $F_1(x)$ and $F_2(z)$ include bit shifts and bit rotations.

4. The method of claim 2, wherein each of the invertible operations is a single instruction defined by the processor.

5. The method of claim 1, wherein each of the first and second operations comprises one of an exclusive OR, an addition, or a subtraction operation.

6. The method of claim 1, wherein each of the functions $G_1$ and $G_2$ is a bijection.

7. The method of claim 1, wherein the lookup table T encodes one or more operations of a cryptographic process.

8. The method of claim 7, where in the cryptographic process is a block cipher.

9. The method of claim 7, wherein the cryptographic process is encryption or decryption.

10. The method of claim 9, wherein the cryptographic process includes a plurality of rounds and each round further includes at least an add round key operation, a mix column operation, a subbyte operation, or an inverse thereof.

11. The method of claim 8, wherein the block cipher is the Advanced Encryption Standard (AES) cipher.

12. The method of Claim 1, wherein $G_1(x)=x \oplus F_1(x)$ and $G_2(z)=z \oplus F_2(z)$.

13. A non-transitory computer readable medium storing executable computer code that when executed by a computing system that includes a processing system having at least one hardware processor performs a method of obtaining an original (non-obfuscated) table entry T[x], the $x^{th}$ value of a lookup table T that encodes one or more operations of a cryptographic process, from an obfuscated lookup table T' that is stored in computer readable memory circuit of the computing system, comprising:
    providing, by the processing system having at least one hardware processor, a value $y=G_1(x)$ to access an entry in the obfuscated lookup table T', where $G_1$ is a first function, where $G_1(x)$ is obtained by performing a first operation upon x and a first predetermined invertible function $F_1(x)$;
    accessing, in the computer readable memory circuit, the obfuscated lookup table T' to obtain a value $z=T'[y]$, where T'[y] is the $y^{th}$ value of the obfuscated lookup table T';
    returning to the cryptographic process the original, non-obfuscated table entry $T[x]=G_2(z)$, where $G_2$ is a second function, and $G_2(z)$ is obtained by performing a second operation upon z and a second predetermined invertible function $F_2(z)$.

14. A computing apparatus comprising:
    a processing system that includes at least one hardware processor, the processing system coupled to a memory, programmed with instructions that when executed by the processing system performs a method of obtaining an original (non-obfuscated) table entry T[x], the $x^{th}$ value of a lookup table T that encodes one or more operations of a cryptographic process, from an obfuscated lookup table T' stored in a computer readable memory circuit, the processing system configured to:
    provide, by the processing system having at least one hardware processor, a value $y=G_1(x)$ to access an entry in the obfuscated lookup table T', where $G_1$ is a first function, where $G_1(x)$ is obtained by performing a first operation upon x and a first predetermined invertible function $F_1(x)$;
    access, in the computer readable memory circuit, the obfuscated lookup table T' to obtain a value $z=T'[y]$, where T'[y] is the $y^{th}$ value of the obfuscated lookup table T';
    return to the cryptographic processor the original, non-obfuscated table entry $T[x]=G_2(z)$, where $G_2$ is a second function, and $G_2(z)$ is obtained by performing a second operation upon z and a second predetermined invertible function $F_2(z)$.

15. A computing apparatus that includes a processing system having at least one hardware processor, the computing apparatus programmed with executable instructions that, when executed by the processing system, perform an operation for returning an original (non-obfuscated) table entry T[x], the $x^{th}$ value of a lookup table T that encodes one or more operations of a cryptographic process, from an obfuscated lookup table T' stored in a computer readable memory circuit of the computing apparatus, comprising:
    a first computer readable memory circuit configured for storing the obfuscated lookup table T';
    a second computer readable memory circuit configured for storing a value $y=G_1(x)$ to be used to access an entry in the obfuscated look up table T', where $G_1$ is a first function and $G_1(x)$ is obtained by performing a first operation upon x and a first invertible function $F_1(x)$;

the processor accessing, in the first computer readable memory circuit, the obfuscated lookup table T' to obtain a value z=T'[y], where T'[y] is the $y^{th}$ value of the obfuscated lookup table T';

the processor returning to the cryptographic process the original, non-obfuscated table entry $T[x]=G_2(z)$, where $G_2$ is a second function, and $G_2(z)$ is obtained by performing a second operation upon z and a second predetermined function $F_2(z)$; and a third computer readable memory circuit configured for storing T[x].

16. The apparatus of claim 15, wherein each of the predetermined functions $F_1(x)$ and $F_2(z)$ is computed using predetermined invertible Boolean logic and arithmetic operations.

17. The apparatus of claim 16, wherein the arithmetic operations performed in $F_1(x)$ and $F_2(z)$ include bit shifts and bit rotations.

18. The apparatus of claim 16, wherein each of the invertible operations is a single instruction defined by the processor.

19. The apparatus of claim 15, wherein each of the first and second operations comprises one of an exclusive OR, an addition, or a subtraction operation.

20. The apparatus of claim 15, wherein each of functions $G_1$ and $G_2$ is a bijection.

21. The apparatus of claim 15, wherein the lookup table T encodes one or more operations of a cryptographic process.

22. The apparatus of claim 21, wherein the cryptographic process is a block cipher.

23. The apparatus of claim 21, wherein the cryptographic process is encryption or decryption.

24. The apparatus of claim 23, wherein the cryptographic process includes a plurality of rounds and each round further includes at least an add round key operation, a mix column operation, a subbyte operation, or an inverse thereof.

25. The apparatus of claim 22, wherein the block cipher is the Advanced Encryption Standard (AES) cipher.

26. The apparatus of Claim 15, wherein $G_1(x)=x \oplus F_1(x)$ and $G_2(z)=z \oplus F_2(z)$.

* * * * *